(12) United States Patent  
Ichikawa

(10) Patent No.: US 8,764,321 B2
(45) Date of Patent: Jul. 1, 2014

(54) RESTRICTING BLADE, LIGHT QUANTITY ADJUSTING DEVICE, OPTICAL APPARATUS, AND METHOD FOR MANUFACTURING RESTRICTING BLADE

(71) Applicant: Masuki Ichikawa, Yamanashi-ken (JP)

(72) Inventor: Masuki Ichikawa, Yamanashi-ken (JP)

(73) Assignee: Nisca Corporation, Minamikoma-gun, Yamanashi-ken (JP)

( * ) Notice: Subject to any disclaimer, the term of this patent is extended or adjusted under 35 U.S.C. 154(b) by 0 days.

(21) Appl. No.: 13/862,870

(22) Filed: Apr. 15, 2013

(65) Prior Publication Data

US 2013/0279897 A1    Oct. 24, 2013

(30) Foreign Application Priority Data

Apr. 18, 2012    (JP) .................. 2012-095091

(51) Int. Cl.
*G03B 9/02*        (2006.01)
(52) U.S. Cl.
USPC .......................................... 396/507; 396/510
(58) Field of Classification Search
USPC ......... 396/449–452, 461, 462, 471, 479–481, 396/483–486, 493–495, 505, 510; 359/738, 359/739
See application file for complete search history.

(56) References Cited

U.S. PATENT DOCUMENTS 5,422,697 A * 6/1995 Ichinomiya et al. .......... 396/510

FOREIGN PATENT DOCUMENTS

| JP | S56-012629 A | 2/1981 |
| JP | 2002-229095 A | 8/2002 |
| JP | 2011-059237 A | 3/2011 |

* cited by examiner

*Primary Examiner* — WB Perkey
*Assistant Examiner* — Minh Phan
(74) *Attorney, Agent, or Firm* — Manabu Kanesaka

(57) ABSTRACT

Provided is a restricting blade 21 which includes a blade substrate 21w and a blade end face 21u defining an aperture diameter as being an end face of the blade substrate 21w, while the blade end face 21u includes a first slant portion 21p which is curved and slanted against an optical axis O, a first leading end portion 21q which forms a leading end of the first slant portion 21p, a second slant portion 21r which is curved and slanted in the approximately same direction as the first slant portion 21p as being overlapped with the first slant portion 21p along the optical axis O, and a second leading end portion 21s which forms a leading end of the second slant portion 21r and the first leading end portion 21q is further protruded toward the optical axis O than the second leading end portion 21s.

6 Claims, 14 Drawing Sheets

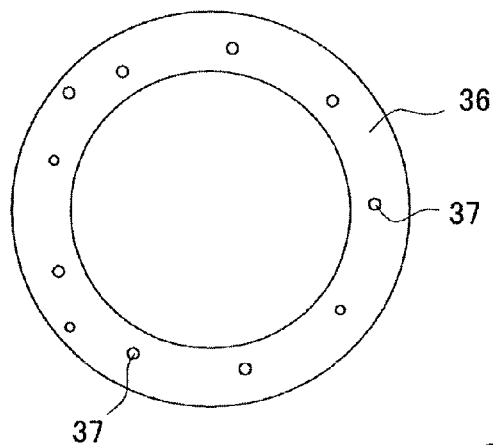
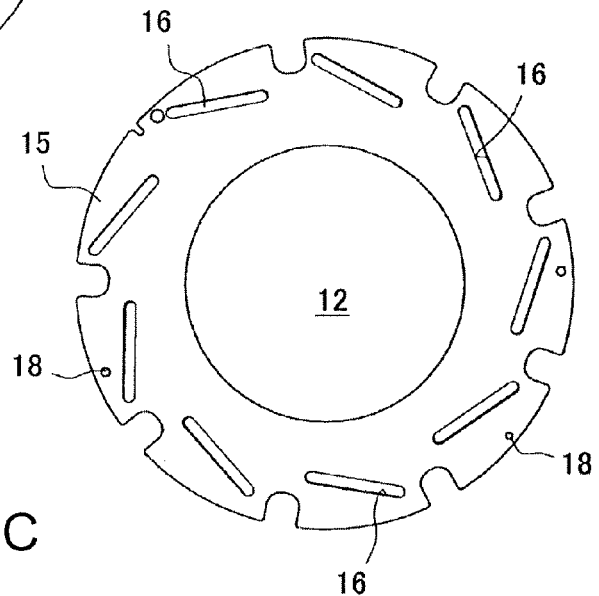
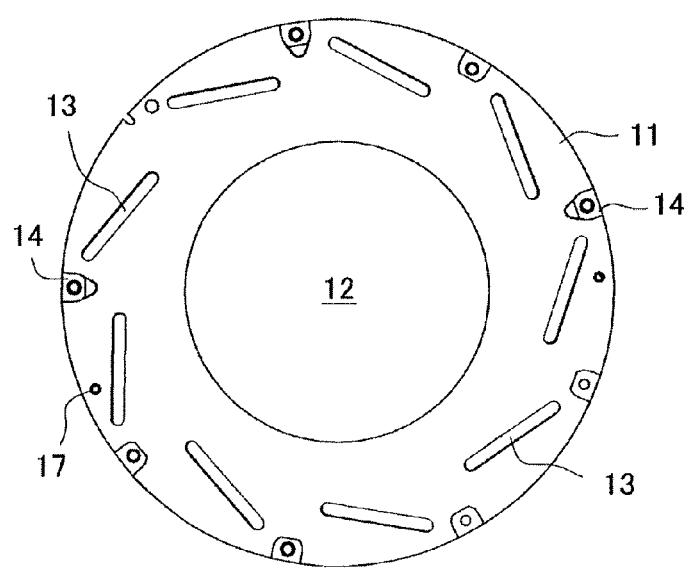

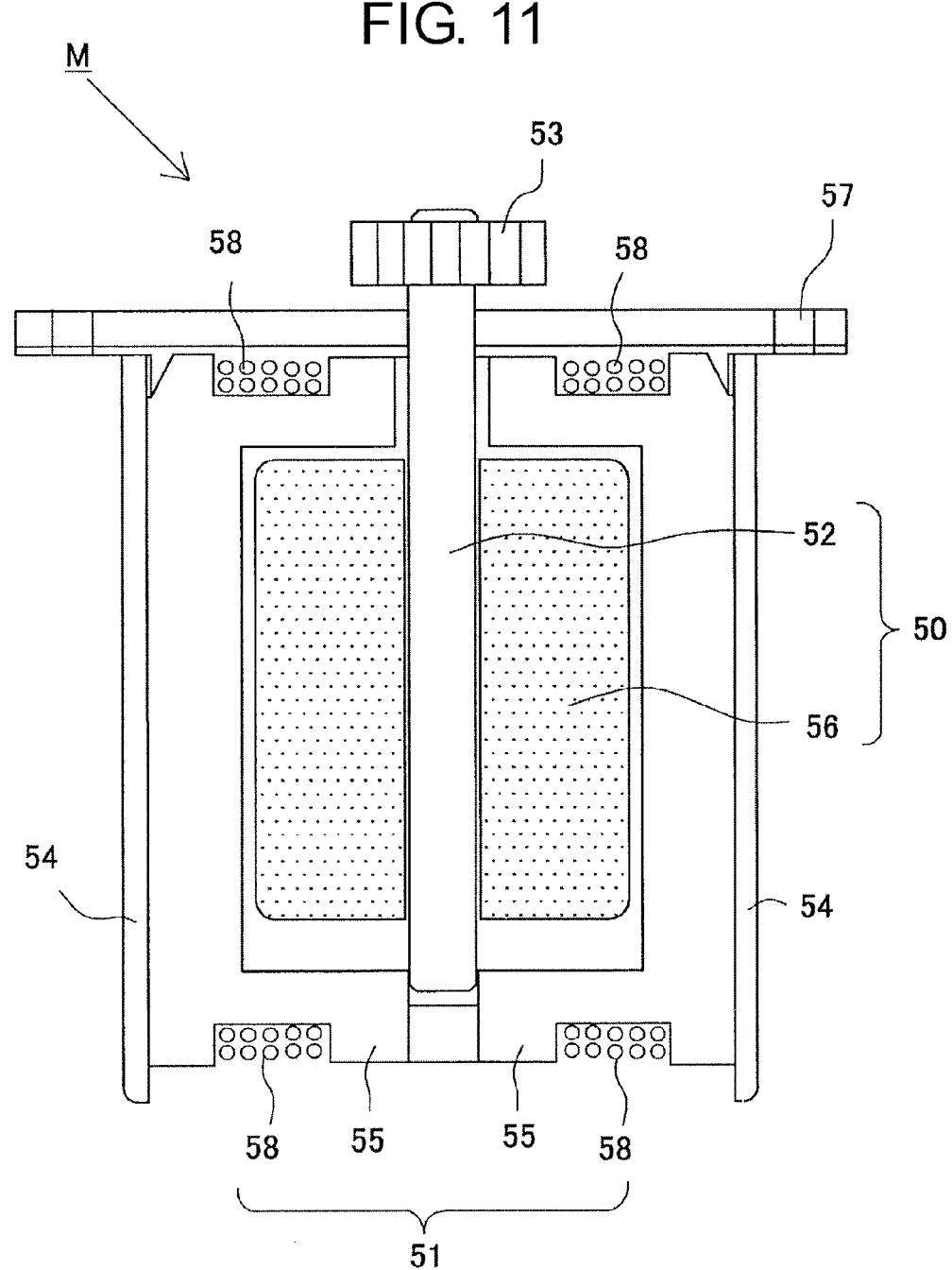

RESTRICTING BLADE, LIGHT QUANTITY ADJUSTING DEVICE, OPTICAL APPARATUS, AND METHOD FOR MANUFACTURING RESTRICTING BLADE

BACKGROUND OF THE INVENTION

1. Field of the Invention

The present invention relates to a restricting blade, a light quantity adjusting device, an optical apparatus, and a method for manufacturing a restricting blade, and in particular, relates to a restricting blade used in a light quantity adjusting device which adjusts light quantity by varying an aperture diameter centered on an optical axis, a light quantity adjusting device using the restricting blade, an optical apparatus including the light quantity adjusting device, and a method for manufacturing the restricting blade.

2. Description of the Related Art

A light quantity adjusting device (iris) is incorporated in an optical apparatus such as an imaging apparatus like a video camera, a still camera or the like, and a projecting apparatus like a projector and is used for adjusting light quantity such as photographing light quantity and projecting light quantity. Here, a plurality of light quantity adjusting blades (hereinafter, called restricting blades) are placed openably and closably at a substrate which has an optical axis aperture on a photographing optical path (or a projecting optical path). Light quantity is adjusted by adjusting an aperture centered on an optical axis to have a large diameter or a small diameter.

As illustrated in FIG. 13A, in general, a restricting blade 21 is configured to include a blade substrate 21w and a blade end face 21u which defines an aperture diameter as being an end face of the blade substrate 21w. Similarly to other members in an optical apparatus, when undesirable internal reflection occurs at the blade end face 21u, image quality is decreased with occurrence of flare, ghost, or the like.

As illustrated in FIG. 13B, in a case that the blade end face 21u has a face parallel to an optical axis O, incoming light from the outside is reflected at the blade end face 21u, so that the reflected light undesirably reaches a sensor side. As illustrated in FIG. 13C, it is ideal that the restricting blade 21 has the blade end face 21u which does not has a face parallel to the optical axis O. For example, it is ideal that the blade end face 21u is processed to be completely oblique.

Conventionally, contrivance has been performed variously to prevent undesirable incidence of reflection light to a sensor side by processing a shape of a blade end face.

It is difficult to process a thin restricting blade (e.g., thickness of 60 μm) into a completely oblique shape. For example, Japanese Patent Application Laid-Open No. 56-012629 discloses a technology to perform cutting after performing face-pressing and Japanese Patent Application Laid-Open No. 2011-059237 discloses a technology to cut a blade end face with blast processing. Further, Japanese Patent Application Laid-Open No. 2002-229095 discloses a restricting blade in which a blade end face has a plurality of stepped portions with mold-forming.

However, with the technology of Japanese Patent Application Laid-Open No. 56-012629, since a surplus part is cut after a blade end face is formed into a tapered shape with face-pressing, there is a fear that reflected light undesirably reaches a sensor side owing to formed cut face. Another embodiment thereof discloses a method to cut a blade end face with punching while setting a blade member which is to be material of a restricting blade in a slanted state. However, there is a fear that accuracy is decreased owing to that the blade member is set in a slanted state. With the technology of Japanese Patent Application Laid-Open No. 2011-059237, there is a problem that cost is prone to increase owning to difficulty for mass production due to long required time for each blasting. Further, although a restricting blade having an end face formed stepwise is manufactured with forming processing with the technology of Japanese Patent Application Laid-Open No. 2002-229055, a thin restricting blade as described above cannot be manufactured with mold-forming.

SUMMARY OF THE INVENTION

To address the above issues, the present invention provides a restricting blade, a light quantity adjusting device, an optical apparatus, and a method for manufacturing a restricting blade without causing a problem such as flare and ghost.

To address the above issues, a first aspect of the present invention discloses a restricting blade to be used for a light quantity adjusting device which adjusts light quantity by varying an aperture diameter centered on an optical axis including a blade substrate, and a blade end face which defines the aperture diameter as being an end face of the blade substrate. Here, the blade end face includes a first slant portion which is slanted against the optical axis, a first leading end portion which forms a leading end of the first slant portion, a second slant portion which is slanted in the approximately same direction as the first slant portion as being overlapped with the first slant portion along the optical axis, and a second leading end portion which forms a leading end of the second slant portion. Further, the first leading end portion is further protruded toward the optical axis than the second leading end portion.

According to the restricting blade of the first aspect, the blade end face includes the first slant portion which is slanted against the optical axis, the first leading end portion which forms the leading end of the first slant portion, the second slant portion which is slanted in the approximately same direction as the first slant portion as being overlapped with the first slant portion along the optical axis, and the second leading end portion which forms the leading end of the second slant portion. Further, the first leading end portion is further protruded toward the optical axis than the second leading end portion. Accordingly, a face parallel to the optical axis is less likely to be formed at the blade end face, so that occurrence of flare, ghost, or the like can be prevented.

To address the above issues, a second aspect of the present invention discloses a light quantity adjusting device which adjusts light quantity by varying an aperture diameter centered on an optical axis with movement of a plurality of restricting blades, each restricting blade including a blade substrate and a blade end face which defines the aperture diameter as being an end face of the blade substrate. Here, the blade end face includes a first slant portion which is slanted against the optical axis, a first leading end portion which forms a leading end of the first slant portion, a second slant portion which is slanted in the approximately same direction as the first slant portion as being overlapped with the first slant portion along the optical axis, and a second leading end portion which forms a leading end of the second slant portion. Further, the first leading end portion is further protruded toward the optical axis than the second leading end portion.

Similarly to the first aspect, according to the light quantity adjusting device of the second aspect, each blade end face of the plurality of restricting blades includes the first slant portion which is slanted against the optical axis, the first leading end portion which forms the leading end of the first slant portion, the second slant portion which is slanted in the approximately same direction as the first slant portion as being overlapped with the first slant portion along the optical axis, and the second leading end portion which forms the leading end of the second slant portion. Further, the first leading end portion is further protruded toward the optical axis than the second leading end portion. Accordingly, a face parallel to the optical axis is less likely to be formed at the blade end face, so that occurrence of flare, ghost, or the like can be prevented.

In the second aspect, it is preferable that the first and second slant portions are slanted with curvature. Further, it is preferable for achieving downsizing and lightening that the restricting blade is made of resin having thickness of 80 micrometer or less. Further, it is preferable that the plurality of restricting blades are incorporated into the light quantity adjusting device so that the first slant portions are faced to incoming light from the outside.

Further, to address the above issues, a third aspect of the present invention discloses an optical apparatus including the light quantity adjusting device according to the second aspect. It is also possible with the third aspect to obtain the effects similar to the second aspect.

Furthermore, to address the above issues, a fourth aspect of the present invention discloses a method for manufacturing the restricting blade according to the first aspect including a setting step of setting a blade member which is to be material of the restricting blade on a setting face, a processing step of performing compressing-processing to compress a blade end face of the blade member with a compressing punch which has a perpendicular face perpendicular to the setting face and a slant face slanted against the perpendicular face and to confine the blade end face with the setting face, the perpendicular face, and the slant face, an end face returning step of returning the blade end face in a direction opposite to the compressing direction while separating the slant face of the compressing punch from the blade end face, and a leading end lifting step of lifting a leading end of the blade end face by moving at least one of the perpendicular face of the compressing punch and a perpendicular face of a pressure receiving member which receives punching pressure of the compressing punch as being formed continuously from the perpendicular face of the compressing punch in a direction opposite to the pressurizing direction of the compressing punch so as to be slidingly contacted to the leading end of the blade end face compressed in the processing step. Here, a first slant portion which is slanted against the optical axis, a first leading end portion which forms a leading end of the first slant portion, a second slant portion which is slanted in the approximately same direction as the first slant portion as being overlapped with the first slant portion along the optical axis, and a second leading end portion which forms a leading end of the second slant portion are formed at the blade end face through the processing step, the end face returning step, and the leading end lifting step.

The restricting blade manufactured with the manufacturing method of the fourth aspect provides the same effects as the restricting blade of the first aspect. In the fourth aspect, it is preferable that the slant face is slanted to have an angle in a range between 62° and 68° against the perpendicular face. Further, it is preferable that the end face returning step and the leading end lifting step are performed concurrently.

According to the present invention, a blade end face of a restricting blade includes a first slant portion which is slanted against an optical axis, a first leading end portion which forms a leading end of the first slant portion, a second slant portion which is slanted in the approximately same direction as the first slant portion as being overlapped with the first slant portion along the optical axis, and a second leading end portion which forms a leading end of the second slant portion. Further, the first leading end portion is further protruded toward the optical axis than the second leading end portion. Accordingly, a face parallel to the optical axis is less likely to be formed at the blade end face, so that occurrence of flare, ghost, or the like can be prevented.

BRIEF DESCRIPTION OF THE DRAWINGS

FIGS. 4A to 4C are plane views of members structuring the light quantity adjusting device of the embodiment, as illustrating a second slide ring, a first slide ring, and a base plate, respectively;

FIG. 11 is a sectional view of an electromagnetic drive unit to be used in the light quantity adjusting device of the embodiment;

DESCRIPTION OF THE EMBODIMENTS

Figure 1:
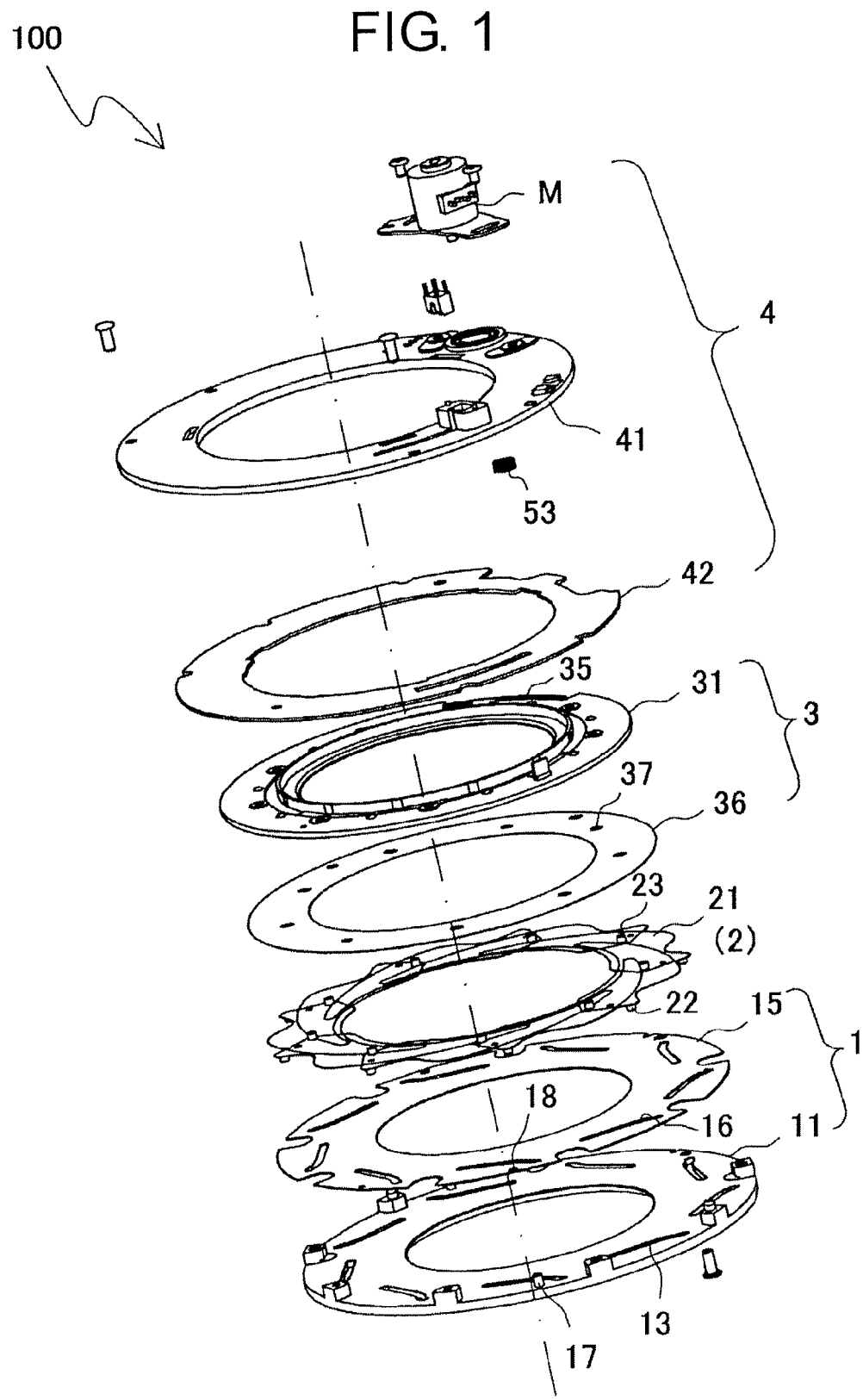
FIG. 1 is an exploded perspective view of a light quantity adjusting device of an embodiment to which the present invention is applicable.

In the following, an embodiment in which the present invention is applied to a light quantity adjusting device will be described. As illustrated in FIG. 1, a light quantity adjusting device 100 includes a first substrate set (base plate set) 1, a blade set 2, a drive ring set 3, and a second substrate set (retainer plate set) 4. The blade set 2 is assembled to the first substrate set 1, and then, the drive ring set 3 and the second substrate set 4 are assembled on the blade set 2. With such a structure, the blade set 2 is sandwiched by the first substrate set 1 and the second substrate set 4 like a sandwich shape. The first substrate set 1 and the second substrate set 4 are integrated with fixing screws (not illustrated).

[Structure of First Substrate Set]

A structure of the first substrate set 1 and the blade set 2 will be described with reference to FIG. 2. The first substrate set 1 includes a base plate 11 and a first slide ring 15. The blade set 2 includes a plurality of restricting blades 21a to 21i.

An optical path aperture 12 is formed at a center part of the base plate 11 and the base plate 11 is shaped in accordance with a lens barrel shape of an imaging apparatus. The base plate 11 is designed to provide toughness to a device with dimensions and material such as metal and resin. Here, the base plate 11 is formed with mold-forming of synthetic resin to which reinforcement fibers such as glass fibers are mixed so as to obtain a thin, small, and light structure.

The base plate 11 includes a blade support face 11x (a flat face or an uneven face) which supports the restricting blades 21 at the periphery of the aperture. Guide grooves 13 which guide (regulate motion of) the restricting blades 21 in opening and closing directions are formed at the blade support face 11x. A structure of the guide grooves 13 will be described later. Connecting projections 14 are formed on the blade support face 11x for fixing the retainer plate 41 with screw holes formed therein.

[First Slide Ring]

The first slide ring 15 is interposed between the blade support face 11x of the base plate 11 and the restricting blades and prevents the restricting blades 21 from directly contacting to the base plate 11. Accordingly, the slide member 15 is formed into a ring shape (hereinafter, called the slide ring). The first slide ring 15 is formed into a ring shape having an optical path aperture 12 at a center part thereof. As illustrated in FIG. 2, the first slide ring 15 is formed into a planar shape being approximately the same as the base plate 11.

The first slide ring 15 is formed of a later-mentioned resin film having a small friction coefficient against the restricting blades 21. The first slide ring 15 is formed with die cutting of a polyethylene resin film, for example. As FIG. 4B illustrates the shape thereof, guide grooves 16 are formed to be matched with the guide grooves 13 of the base plate 11. The guide grooves 16 will be described later.

In a case that the base plate 11 is formed with mold-forming of resin and the first slide ring 15 is formed with die cutting of a resin film, the slide ring 15 can have higher shape accuracy than that of the base plate 11.

The first slide ring 15 is formed into a shape approximately the same as the base plate 11. The first slide ring 15 supports base end portions 21x of the plurality of restricting blades 21 (21a to 21i) at the periphery of the optical path aperture 12 which is located at the center and supports top end portions 21y to be faced to the inside of the optical path aperture 12 (see FIG. 9A).

[Restricting Blades]

Figure 9A:
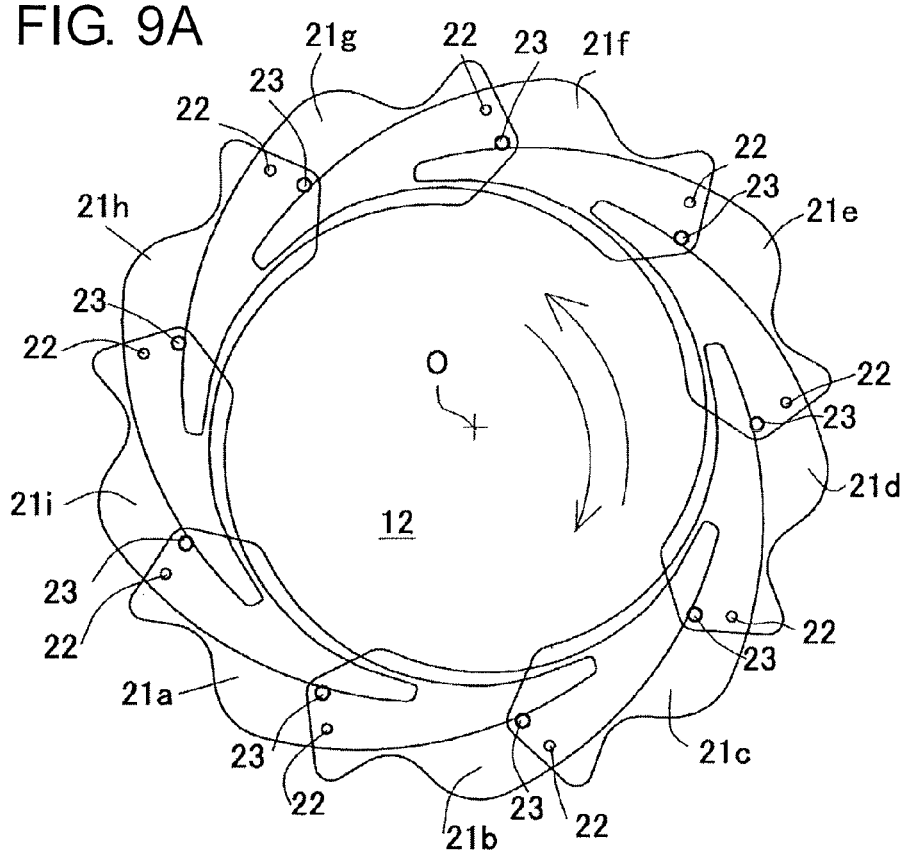
FIGS. 9A and 9B are plane views of a plurality of restricting blades to be used in the light quantity adjusting device of the embodiment, as indicating arrangement of the restricting blades and open-close operation of the restricting blade, respectively.

The blade set 2 includes the plurality of restricting blades 21a to 21i. As illustrated in FIG. 9A, the restricting blades 21 include nine restricting blades and the respective restricting blades 21 are formed into the same shape.

Figure 5A:
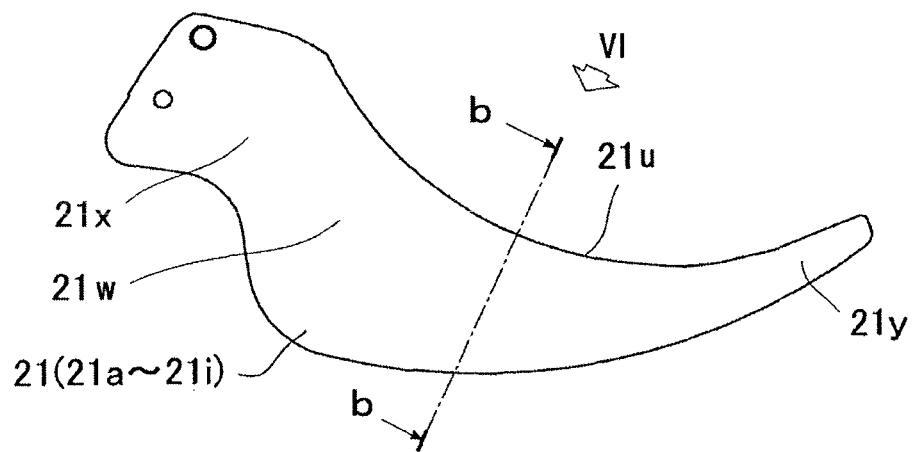
FIGS. 5A and 5B illustrate a restricting blade to be used in the light quantity adjusting device of the embodiment, as FIG. 5A being a plane view of the restricting blade and FIG. 5B being an explanatory view schematically illustrating a blade end face of a section at line b-b in FIG. 5A.

As illustrated in FIG. 5A, each restricting blade 21 is configured to include a blade substrate 21w and a blade end face 21u which defines an aperture diameter as being an end face of the blade substrate 21w. The blade substrate 21w includes the base end portion 21x which is supported by the base plate 11 via the abovementioned first slide ring 15 at one side (left side in FIG. 5A) and the top end portion 21y which opens and closes the optical path aperture 12 at the other side (right side in FIG. 5A). Here, the top end portions 21x of the plurality of restricting blades 21 are configured to be overlapped in a scale-like manner from one another to form the circular optical path aperture 12.

[Shape of Blade End Face]

Figure 5B:
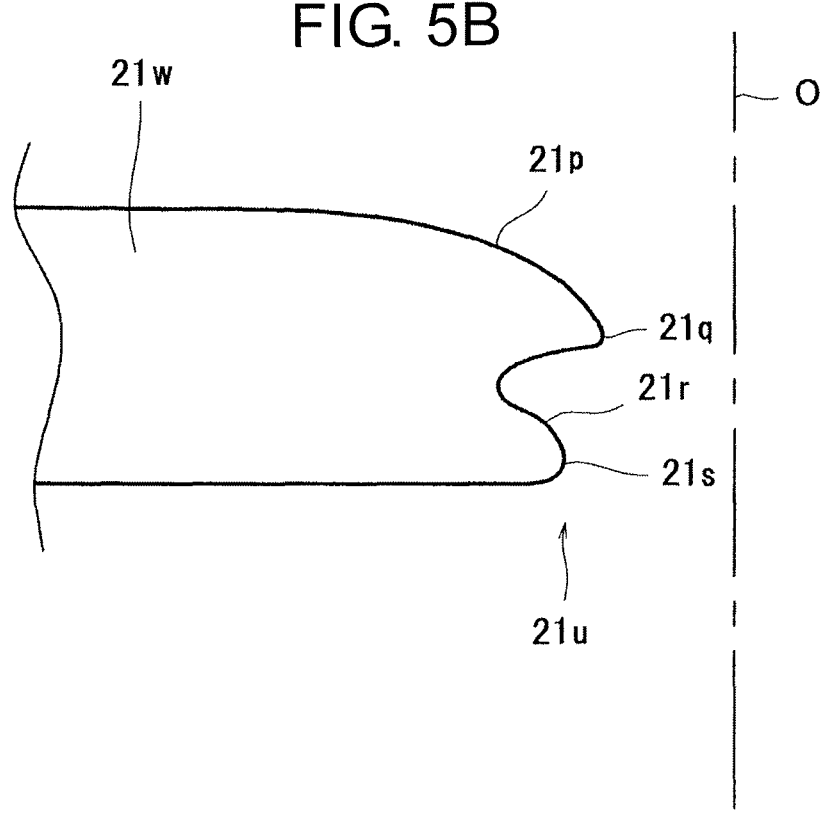

A feature of the present invention relates to the shape of the blade end face 21u. FIG. 5B schematically illustrates a section of the blade end face 21u at line b-b in FIG. 5A. In short, regarding the sectional shape of the blade end face 21u, there is no face parallel to the optical axis O (the center of the optical path aperture 12) or area of a face parallel thereto is extremely small. Details thereof are as follows.

As illustrated in FIG. 5B, from an upper face side toward a lower face side of the restricting blade 21, the blade end face 21u includes a first slant portion 21p which is curved and slanted against the optical axis O, a first leading end portion 21q which forms a leading end of the first slant portion 21p, a second slant portion 21r which is curved and slanted in the approximately same direction as the first slant portion 21p as being overlapped (superimposed) with the first slant portion 21p along the optical axis O, and a second leading end portion 21s which forms a leading end of the second slant portion 21r. The blade end face 21u is configured to have a sectional structure in which the first leading end portion 21q is further protruded toward the optical axis O side than the second leading end portion 21s. Here, a curved slant face is formed between the first leading end portion 21q and the second slant portion 21r. Owing to the abovementioned sectional structure of the blade end face 21u, there is no face at the blade end face 21u parallel to the optical axis O or area of a face parallel thereto is extremely small. Accordingly, the restricting blade 21 can prevent occurrence of flare, ghost, or the like at the blade end face 21u.

Figure 6A:
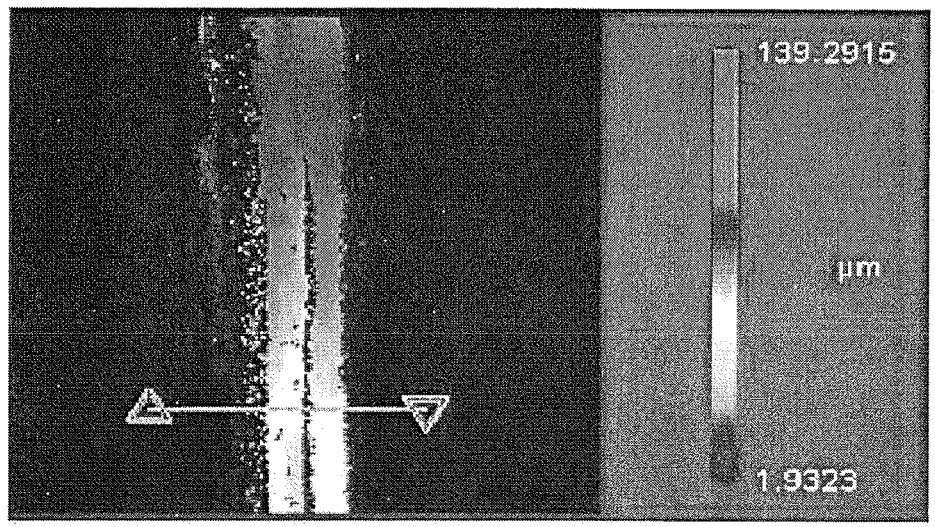
FIGS. 6A and 6B are photographs of the blade end face of the restricting blade to be used in the light quantity adjusting device of the embodiment, as FIG. 6A being a laser microscope photograph of the blade end face and FIG. 6B being a three-dimensional image photograph with an imaging process performed based on height information of the blade end face in FIG. 6A.
Figure 6B:
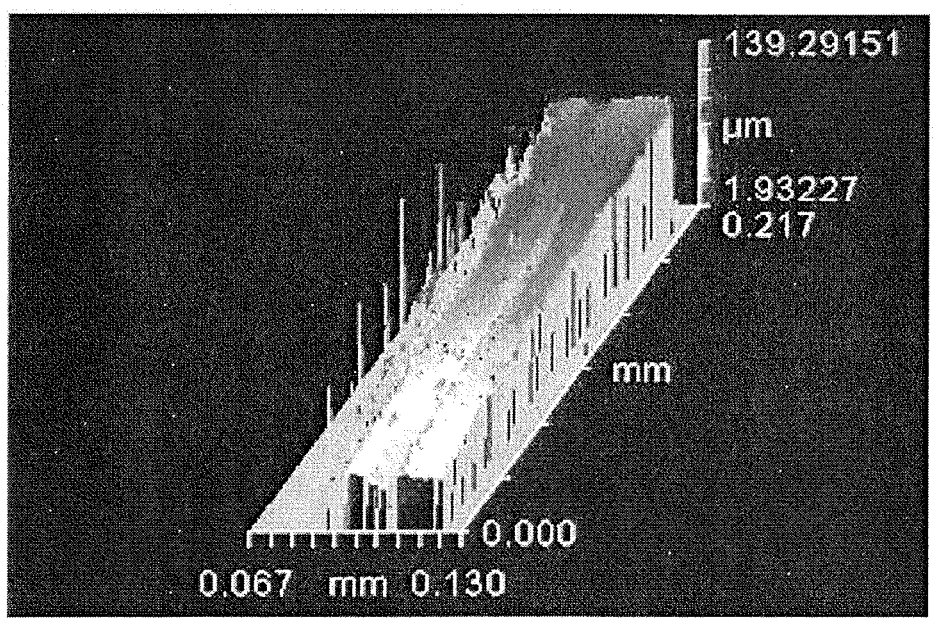

FIG. 6A shows a laser microscope photograph at a surface of the blade end face 21u of the restricting blade 21 in the present embodiment. FIG. 6B shows a three-dimensional image photograph with an imaging process performed based on height information of the surface of the blade end face 21u in FIG. 6A. Here, a line connecting an upper triangle and a lower triangle in FIG. 6A corresponds to a section at line b-b in FIG. 5A viewing from side VI.

[Other Structure of Restricting Blade]

Figure 10A:
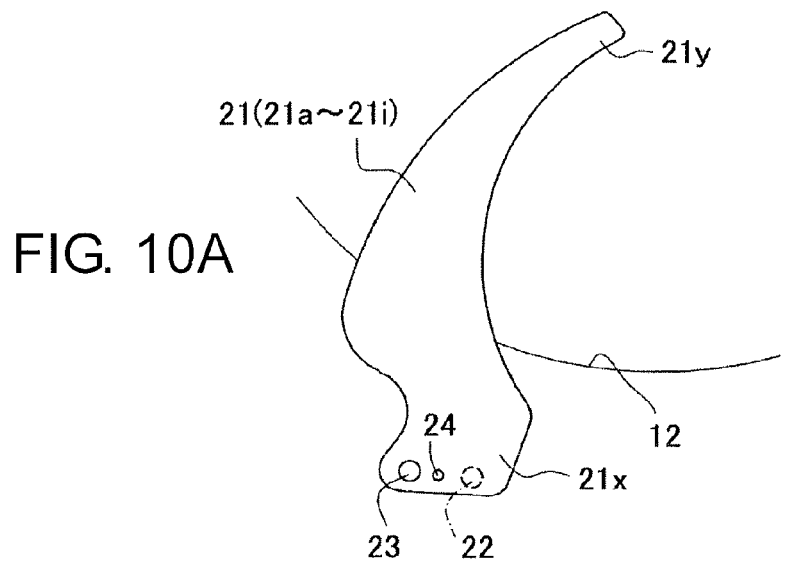
FIG. 10A is a plane view of a restricting blade in a state that a base end portion is supported by the base plate.

As illustrated in FIG. 10A, a first protrusion (guide pin) 22 and a second protrusion (operation pin) 23 are installed on the front and back of each restricting blade 21. The guide pin 22 is located at each restricting blade 21 at a position faced to the base plate 11 side and the operation pin 23 is located at the opposite face (later-mentioned second substrate side). As described later, the guide pin 22 is fitted to the guide groove 13 of the base plate 11 and the guide groove 16 of the first slide ring 15 and the operation pin 23 is fitted to a fit hole of a later-mentioned operation member 31. Here, a positioning hole 24 is for installing (e.g., melt-joining) the first protrusion 22 and the second protrusion 23 to the restricting blade 21 and is for defining the blade external shape and installation positions of the first protrusion 22 and the second protrusion 23.

[Method for Manufacturing Restricting Blade]

Next, a method for manufacturing the restricting blade 21 having the abovementioned blade end face 21u will be described. The restricting blade 21 used in the present embodiment is manufactured through (1) preparing step, (2) setting step, (3) processing step, (4) end face forming step, and (5) pin installing step. In the following, the respective steps will be described sequentially.

(1) Preparing Step

In the preparing step, a blade member to be a material of the restricting blade 21 is prepared. In the present embodiment, the blade member is manufactured by punching, with a punching die, a resin film (e.g., a resin film of black PET obtained by adding carbon black to polyethylene terephthalate, the present example adopts MDVD of a Soma-black series manufactured by Somar Corporation, see http://www-.somar.co.jp/products/03_14.html) having a predetermined width (e.g., 60 µm) on which surface treatment (sandblast treatment and conductive sliding treatment) is performed. Concurrently, the positioning hole 24 is formed as well. Accordingly, in the prepared blade member, the first protrusion 22 and the second protrusion 23 are not installed and the abovementioned blade end face 21u is not formed. The surface treatment performed on the blade member improves sliding characteristics and light-blocking characteristics of the restricting blade 21. In the present example, the blade member having thickness of 60 µm is used. However, not limited to the above, the present invention may adopt a blade member (restricting blade 21) having thickness of 80 µm or less.

(2) Setting Step

Subsequently, in the setting step, the blade member prepared in the preparing step is set on a setting face of an end face forming apparatus.

Figure 7A:
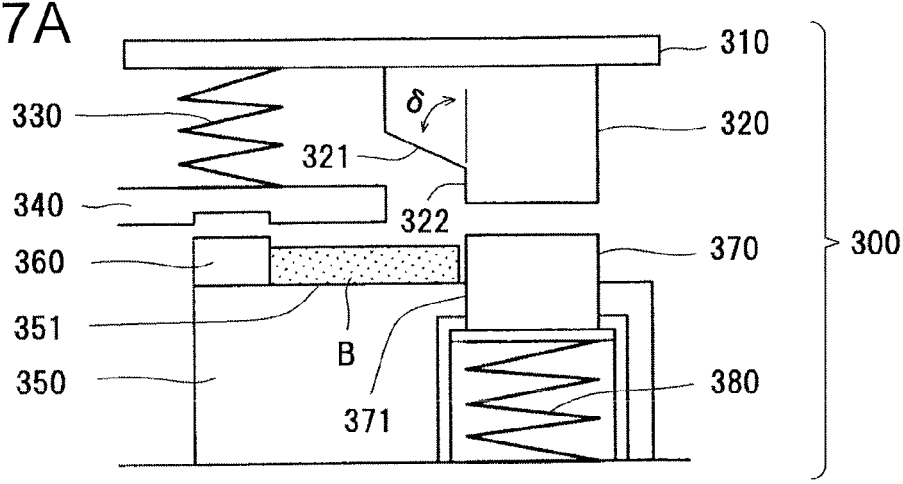
FIGS. 7A to 7C are explanatory views schematically illustrating a method for manufacturing the restricting blade to be used in the light quantity adjusting device of the embodiment, as illustrating a state that a blade member is set on a setting face, a state that compressing-processing is performed on the blade member, and a state that the restricting blade is obtained by leaving the blade member after the compressing-processing, respectively.

Here, an example of the end face forming apparatus will be described. As illustrated in FIG. 7A, the end face forming apparatus 300 includes a die plate 350 having an approximately horizontal setting face 351 at an upper face thereof on a base (not illustrated) and a guide 360 which holds an end face other than the blade end face of the blade member B (see FIG. 5A as well) as being placed at one side (left side in FIG. 7A) on the die plate 350. A flat-plate-shaped stripper plate 340 is placed above the guide 360. A fitting groove which is fit to the upper side of the guide 360 is formed at a center part of a lower face side (a side faced to the guide 360) of the stripper plate 340. One side of a first spring 330 is fixed to an upper face side of the stripper plate 340 and the other end of the first spring 330 is fixed to a lower face side of a flat-plate-shaped pressurization plate 310.

Further, the end face forming apparatus 300 includes a second spring 380 having one end fixed to the base (not illustrated) as being placed at the other side (right side in FIG. 7A) of the die plate 350. A slide knockout 370 which receives pressure from a compressing punch 320 is placed on the second spring 380 via a flat-plate-shaped plate to which the other side of the second spring 380 is fixed. The compressing punch 320 which is fixed to a lower face side of the pressurization plate 310 is placed above the slide knockout 370. The compressing punch 320 includes a perpendicular face 322 which is perpendicular to the setting face 351 and a slant face 321 which is slanted against the perpendicular face 322 by a predetermined angle (δ°). In the end face forming apparatus 300 of the present example, the slant angle δ of the slant face 321 to the perpendicular face 322 is set to 65°. According to findings of the present inventor with evaluation of sectional shapes as illustrated in FIGS. 6A and 6B while setting the slant angle δ to various angles, it is preferable that the slant angle δ is in a range between 62° and 68° to eliminate a face parallel to an optical axis. Further, the slide knockout 370 also includes a perpendicular face 371 which is perpendicular to the setting face 351. Here, the perpendicular face 371 of the slide knockout 370 is configured to form a continuous perpendicular face with the perpendicular face 322 of the compressing punch 320 when pressure is received from the compressing punch 320 (see FIG. 7B).

The exemplified end face forming apparatus 300 is structured with a pressure applying unit which includes the pressurization plate 310, the first spring 330, the stripper plate 340, and the compressing punch 320 and a pressure receiving unit which includes the die plate 350 with the setting face 351, the guide 360, the second spring 380, and the slide knockout 370. To facilitate setting of the blade member B on the setting face 351 and ejecting the blade member B from the setting face 351, the pressure applying unit is configured to be movable between a first position (position illustrated in FIG. 7A) where the pressure applying unit is close to the pressure receiving unit and a second position where the pressure applying unit is apart from the pressure receiving unit.

In the setting step using the end face forming apparatus 300 as described above, the blade member B is set on the setting face 351 while an end face other than the blade end face of the blade member B is abutted to the guide 360 after the pressure applying unit is moved to the second position, and then, the pressure applying unit is moved to the first position (i.e., state illustrated in FIG. 7A).

(3) Processing Step

Subsequently, in the processing step, compressing-processing is performed so that the blade end face of the blade member B is confined by the setting face 351, the perpendicular face 322, and the slant face 321 while the blade end face is compressed by the compressing punch 320 which includes the perpendicular face 322 perpendicular to the setting face 351 and the slant face 321 slanted against the perpendicular face 322.

Figure 7B:
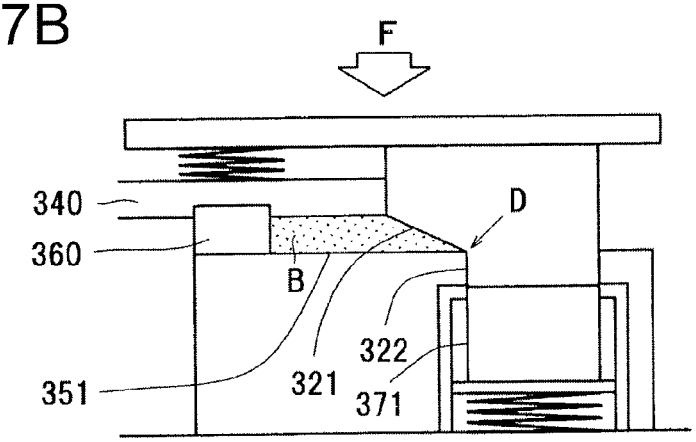

As illustrated in FIG. 7B, predetermined punching pressure (0.6 ton in the present example) is applied to the pressurization plate 310 at room temperature (without heating). In the present example, punching speed is set to 5 mm/sec and the punching pressure is released right after punching. When the punching pressure is applied, first, the stripper plate 340 holds the blade member B with the fitting groove thereof fitted to the upper side of the guide 360, and then, the compressing punch 320 compresses the blade end face of the blade member B. Since the punch pressure is applied only to the slant face 321 of the compressing punch 320, line pressure of 0.6 ton is applied along the blade end face of the blade member B. Further, when the punch pressure is applied to the compressing punch 320, the blade end face is compressed as being confined by the setting face 351, the perpendicular face 322, and the slant face 321. Here, FIG. 7B illustrates a state that the blade end face of the blade member B is confined by the setting face 351 and the slant face 321. At that time, the blade end face is compressed so that the first leading end portion 21q and the second leading end portion 21s are overlapped.

(4) End Face Forming Step

Figure 7C:
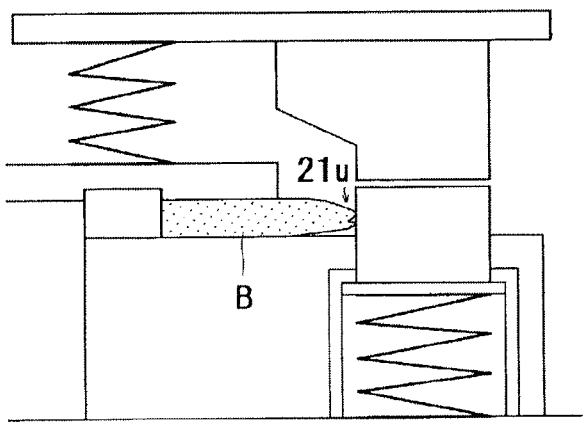
Figure 8:
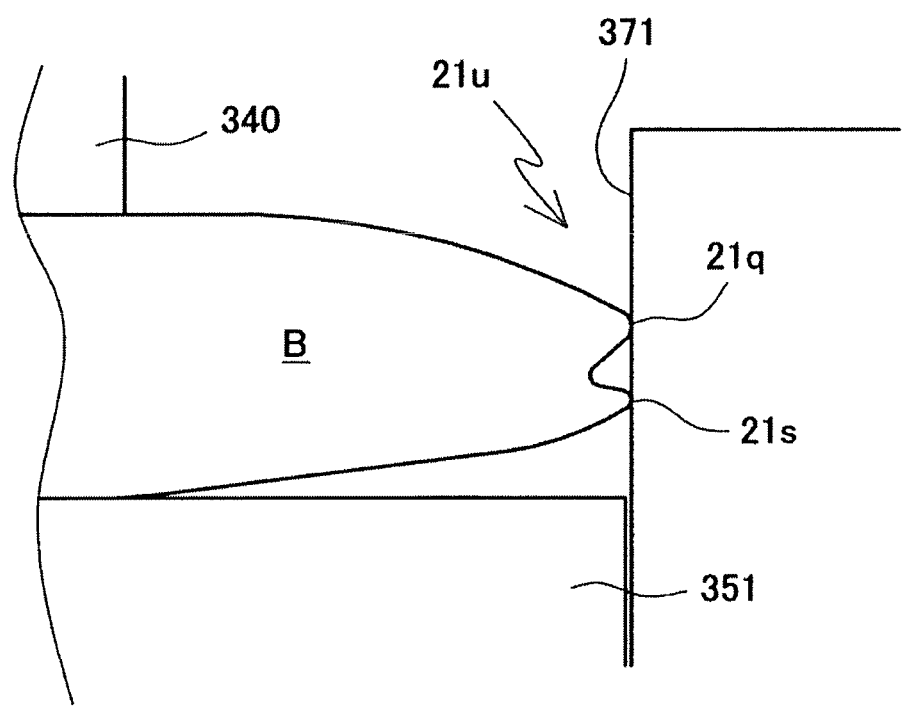
FIG. 8 is an enlarged view of a blade leading end portion in FIG. 7C.

The end face forming step to be performed subsequently includes two substeps being (4-1) an end face returning substep and (4-2) a leading end lifting substep. As described above, punching pressure is released right after punching with the compressing punch 320. As illustrated in FIG. 7C, when the punching pressure is released, the slide knockout 370 and the compressing punch 320 are returned to positions as in FIG. 7A before the punching pressure is applied (are moved in a direction opposite to the pressurizing direction of the punching pressure). At that time, due to material characteristics of the blade member B, a compressed face and a leading end D swell in a direction returning from the pressurized direction, so that the first leading end portion 21q and the second leading end portion 21s are formed (the end face returning substep). At the same time as the above, the leading end D (the first leading end portion 21q and the second leading end portion 21s) of the blade member B at the perpendicular face 322 side of the compressing punch 320 is slidingly contacted to the perpendicular face 322 of the compressing punch 320 and the perpendicular face 371 of the slide knockout 370 continued from the perpendicular face 322 (in the present example, slidingly contacted mainly to the perpendicular face 371 of the slide knockout 370), and then, is lifted upward as illustrated in FIGS. 7C and 8 (the leading end lifting substep). Owing to the end face returning due to the material characteristics of the blade member B and the lifting by the perpendicular faces 322, 371 of the compressing punch 320 and the slide knockout 370, the first leading end portion 21q and the second leading end portion 21s described above are formed at the blade end face 21u of the blade member B. Here, since the blade member B is held by the stripper plate 340 when the leading end D of the blade member B is lifted by the perpendicular faces 322, 371, only the blade end face 21u is lifted as being warped as illustrated in FIGS. 7C and 8, so that the first leading end portion 21q and the second leading end portion 21s are contacted as being slanted against the perpendicular faces 322, 371. In the end face forming apparatus 300 of the present example, the top end of the compressing punch 320 firstly leaves from the slide knockout 370 (the state in FIG. 7C), and then, the stripper plate 340 leaves from the blade member B. Subsequently, the stripper plate 340 is moved to the second position and the blade member B is ejected from the end face forming apparatus 300. Then, the warping of the blade end face 21u is released, so that the first leading end portion 21q is protruded further toward the optical axis O than the second leading end portion 21s, as illustrated in FIG. 5B.

According to the above processes, as illustrated in FIG. 5B, the blade end face 21u is configured to include the first slant portion 21p which is slanted against the optical axis O, the first leading end portion 21q which forms the leading end of the first slant portion 21p, the second slant portion 21r which is slanted in the approximately same direction as the first slant portion 21p as being overlapped with the first slant portion 21p along the optical axis O, and the second leading end portion 21s which forms the leading end of the second slant portion 21r and to have a stable shape that the first leading end portion 21q is further protruded toward the optical axis O side than the second leading end portion 21s. In the present example, the perpendicular face 371 of the slide knockout 370 is set longer than the perpendicular face 322 of the compressing punch 320, so that the blade end face 21u is lifted mainly by the perpendicular face 371. However, not limited to the above, it is possible to elongate the perpendicular face 322 and to lift the blade end face 21u mainly by the perpendicular face 322. Alternatively, the blade end face 21u may be lifted only by either the perpendicular face 322 of the compressing punch 320 or the perpendicular face 371 of the slide knockout 370.

(5) Pin Installing Step

As described above, manufacturing of the restricting blade 21 is completed by installing the first protrusion 22 and the second protrusion 23 on the front and back of the blade member B (see FIG. 10A). Here, the pin installing step may be performed before the setting step. In this case, it is only required to arrange a concave portion for preventing interference with the first protrusion 22 and the second protrusion 23 at the setting face 351 and the stripper plate 340 of the end face forming apparatus 300.

[Relation Between Guide Groove and Guide Pin]

Next, description will be performed on a relation among the guide groove 13 formed at the base plate 11, the guide groove 16 formed at the first slid ring 15, and the guide pin 22 formed at each restricting blade 21.

Figure 10B:
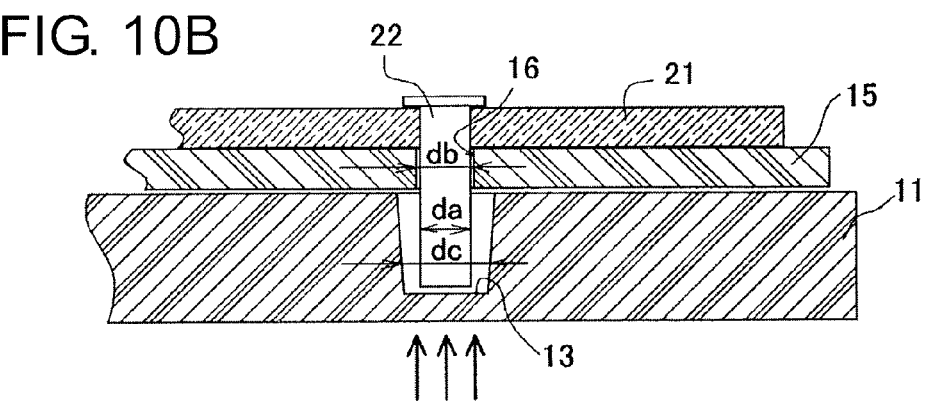
FIG. 10B is a sectional view illustrating a fitted state between a guide pin and a guide groove.
Figure 10C:
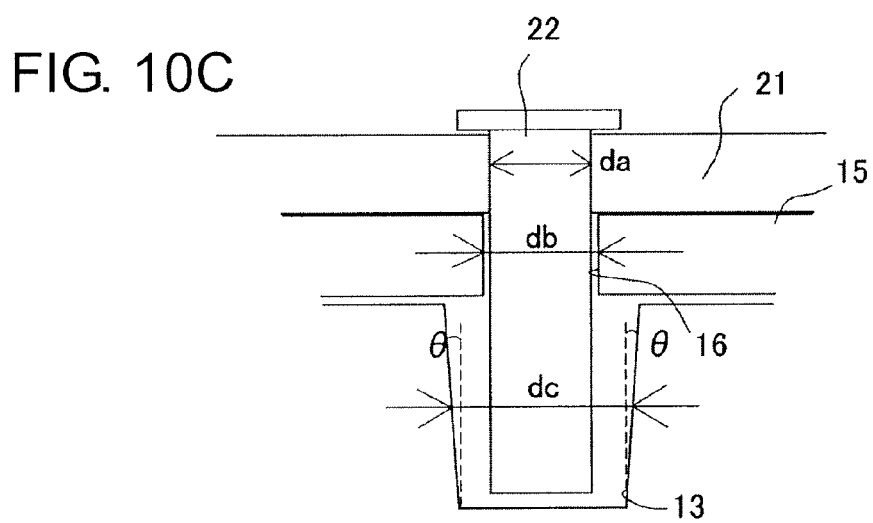
FIG. 10C is an enlarged sectional view of FIG. 10B.

As illustrated in FIGS. 10B and 10C, the guide groove 13 of the base plate 11 is formed as a concaved groove in a blind-groove shape through which light is not transmitted from the outside of the base plate 11 (in a direction of arrows in FIG. 10B). Since the base plate 11 is formed with mold-forming, the guide groove 13 is formed to have a draft angle θ and a mean inner width dc.

Further, the guide groove 16 of the first slide ring 15 is formed as a through hole having an inner width db. The through hole is formed to have an even inner width with die cutting of a resin film.

Meanwhile, the guide pin 22 having an outer diameter da is installed on each of the restricting blades 21a to 21i. Here, the pin outer diameter da, the guide groove inner width db, and the mean inner width do are set to satisfy "da≤db<dc". That is, the guide groove 16 of the first slide ring 15 is narrower than the guide groove 13 of the base plate 11 ("db<dc") and is set to have a dimension for fitting with the guide pin outer diameter da ("da≤db").

Accordingly, as illustrated in FIGS. 10A and 10B, the guide pin 22 installed on each restricting blade 21 is motionally restricted as being engaged with the guide groove 16 of the first slide ring 15 without being abutted to the guide groove 13 of the base plate 11. Accordingly, the guide pin 22 is not unstably engaged with the guide groove 13 of the base plate 11 having the draft angle θ. With the above, the restricting blade 21 is prevented from being slanted and lifted.

[Structure of Second Substrate Set]

The second substrate set 4 and the drive ring set 3 will be described with reference to FIG. 3. The second substrate set 4 includes the retainer plate 41, a reinforcement plate 42, and a drive unit M which is fixed to the retainer plate 41. Further, the drive ring set 3 includes the operation member 31 and a second slide ring 36. Each structure of the above will be described in the following.

<Retainer Plate>

Figure 3:
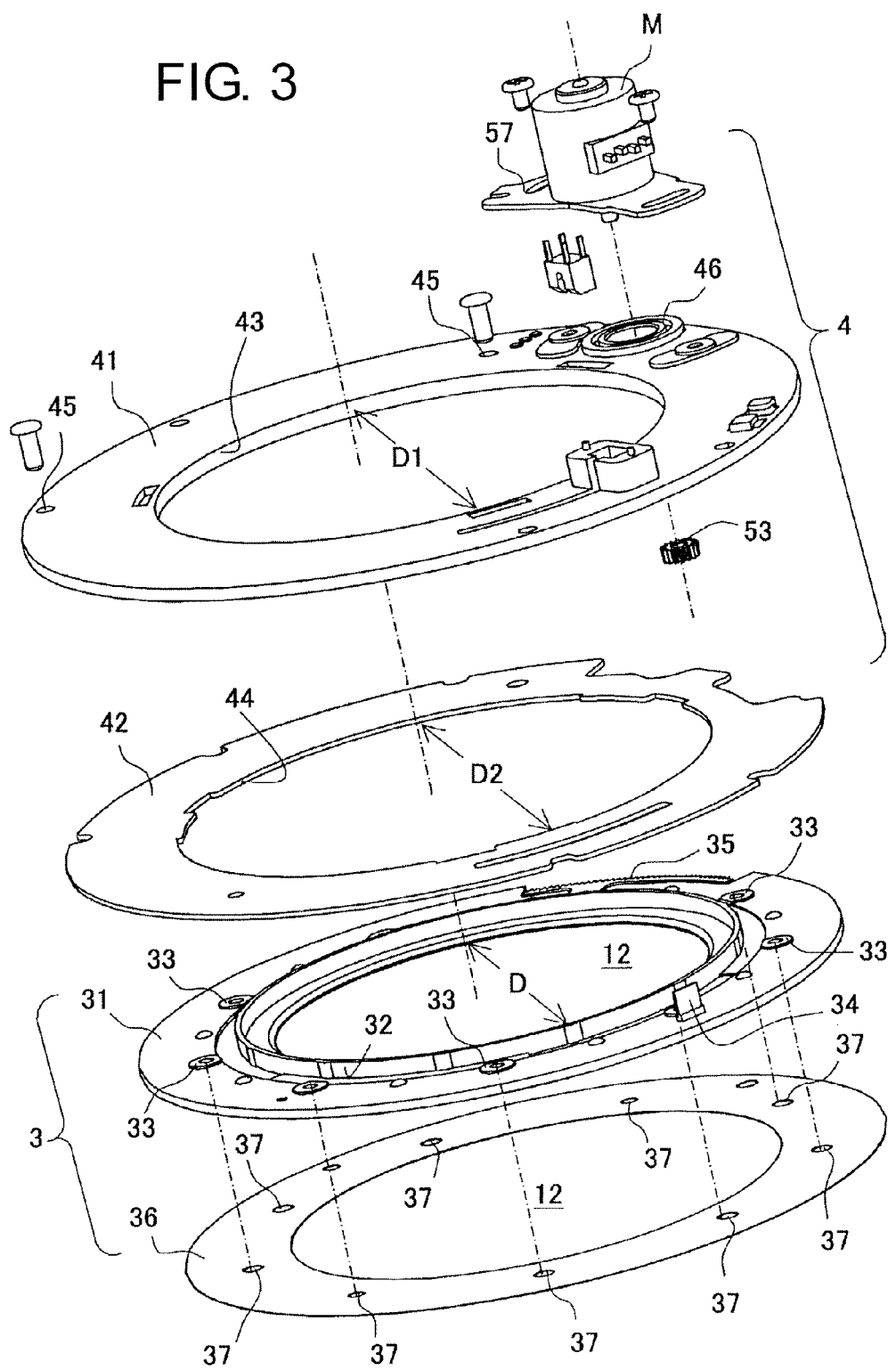
FIG. 3 is a perspective view illustrating an assembling state of a drive ring set and a second substrate set of the light quantity adjusting device of the embodiment.

As illustrated in FIG. 3, the retainer plate 41 is formed into a ring shape having an opening 43 at a center part thereof as being approximately the same shape as the abovementioned base plate 11. The retainer plate 41 in FIG. 3 is formed in resin mold-forming with an attachment seat 46 for the drive unit M arranged at a part of an outer periphery thereof. The drive unit M described later is fixed to the attachment seat 46 with screws or the like. Connecting holes 45 are formed for screw-fixing the retainer plate 41 to the connecting projections 14 of the base plate 11.

<Reinforcement Plate>

As illustrated in FIG. 3, the reinforcement plate 42 is made of relatively strong plate material such as metal and reinforces the resin-made retainer plate 41. In a case that the retainer plate 41 has sufficient strength, the reinforcement plate 42 may be eliminated. The reinforcement plate 42 includes an opening 44 at a center part thereof as being formed into a shape being approximately the same as the retainer plate 41.

Both the opening 43 of the retainer plate 41 and the opening 44 of the reinforcement plate 42 are set to be larger than the diameter D of the optical path aperture 12. The diameter D1 of the opening 43, the diameter D2 of the opening 44, and the diameter D of the optical path aperture 12 are set to satisfy "D2≧D1>D".

The drive ring set 3 includes the operation member 31 which transmits driving of the drive motor (later-mentioned drive unit) M to the restricting blades 21 and the second slide ring 36.

<Operation Member>

As illustrated in FIG. 3, the operation member 31 is formed into a ring shape (hereinafter, called a drive ring) having the optical path aperture 12 at a center part thereof, for example, with resin mold-forming. The drive ring 31 is rotatably attached to the retainer plate 41 via the reinforcement plate 42. The drive ring 31 includes a flange 32 and an engaging protrusion 34 at the periphery of the optical path aperture 12. The flange 32 is fitted to the opening 43 of the retainer plate 41 and the opening 44 of the reinforcement plate 42 and is rotated concentrically with the optical path aperture 12. Further, the engaging protrusion 34 is formed on a face which is sliding-contacted to the reinforcement plate 42 and assists smooth sliding between the operation member 31 and the reinforcement plate 42.

The drive ring 31 is rotatably assembled to the retainer plate 41 as described above and is provided with driven teeth 35 at a part of the periphery thereof. The driven teeth 35 are arranged at positions to be engaged with a later-mentioned drive gear 53 of the drive unit M which is attached to the attachment seat 46 of the retainer plate 41.

The fitting holes 33 to which the operation pins 23 installed on the respective restricting blades 21 are formed at the periphery of the optical path aperture 12. The fitting holes 33 are arranged at the periphery of the optical path aperture 12 so that the number thereof is matched with the number of the restricting blades 21 (being nine in the drawings).

In the above structure, the drive ring 31 is rotatably supported by the retainer plate 41 and is to be rotated by a specific angle by the drive gear 53 of the drive unit M. Then, the rotation of the drive ring 31 is transmitted to the respective restricting blades 21a to 21i.

<Second Slide Ring>

As illustrated in FIG. 3, the second slide ring 36 is made of a resin film (e.g., a film of resin such as polyethylene) having an optical path aperture 12 at a center part thereof and is interposed between the drive ring 31 and the restricting blades 21. With the above structure, smooth open-close operation of the restricting blades 21 is obtained while preventing direct contact between the drive ring 31 and the restricting blades 21. The second slide ring 36 is formed into a ring shape similarly to the drive ring 31. The second slide ring 36 has fitting holes 37 at positions being matched with the fitting holes 33 of the drive ring 31.

<Drive Unit M>

FIG. 11 illustrates an embodiment of the drive unit M. The drive unit M in FIG. 11 includes a magnet rotor 50, a stator coil 51, the drive gear 53, and a yoke 54. The magnet rotor 50 is structured by integrating a drive rotary shaft 52 and a permanent magnet 56. Both end sections of the drive rotary shaft 52 are bearing-supported by a coil frame 55. The permanent magnet 56 has two poles being N-pole and S-pole at the outer circumference thereof. The drive gear 53 is attached to the drive rotary shaft 52. Further, a stator coil 51 includes the coil frame 55 and a coil 58 wound therearound. The coil frame 55 is longitudinally or laterally halved for incorporating the magnet rotor 50. A bracket 57 is formed integrally with the coil frame 55 and the yoke 54 is fitted to an outer circumference of the coil frame 55.

With the above structure, when the coil 58 is powered, the magnet rotor 50 is rotated by a specific angle clockwise or counterclockwise to rotate the drive gear 53 normally or reversely. With the drive unit M structured as described above, the bracket 57 is fixed to the attachment seat 46 of the retainer plate 41 with screws or the like. Then, the drive gear 53 is engaged with the driven teeth 35 of the drive ring 31. According to the above, the drive ring 31 is repeatedly moved by a specific angle clockwise or counterclockwise in FIG. 3, so that the restricting blades 21 are opened and closed.

<Description of Assembling State>

Assembling procedure of the light quantity adjusting device 100 will be described with reference to FIG. 1. The first slide ring 15 is laid on the base plate 11 structured as described above. Positioning therebetween is performed while a positioning pin 17 arranged at the base plate 11 is fitted to a positioning hole 18 of the first slide ring 15.

Figure 2:
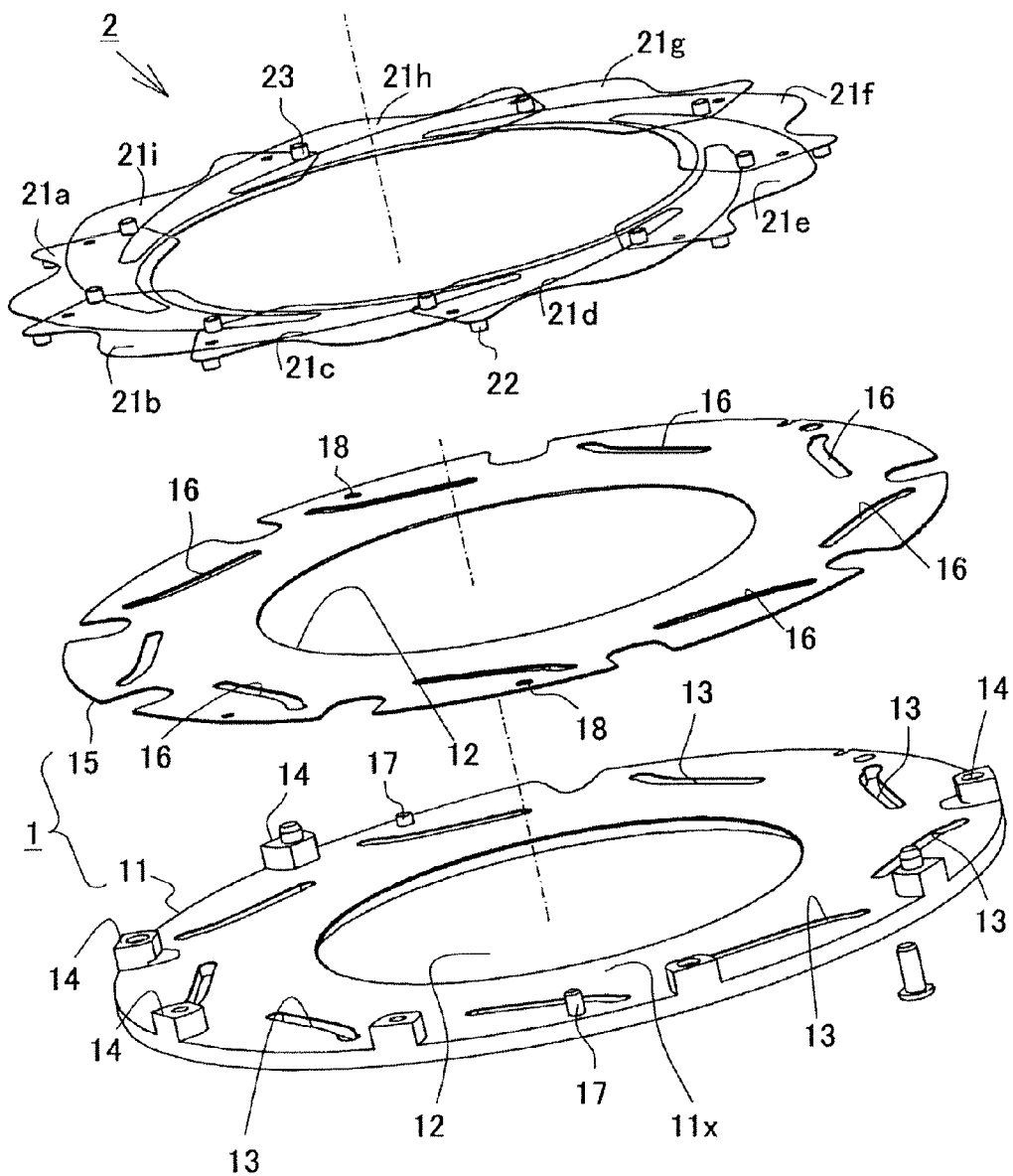
FIG. 2 is a perspective view illustrating an assembling state of a first substrate set and a blade set of the light quantity adjusting device of the embodiment.

As illustrated in FIG. 2, the first to ninth restricting blades 21a to 21i are laid on the first slide ring 15 which is laid on the base plate 11. At that time, the guide pins 22 of the respective restricting blades 21 are fitted to the guide grooves 13 and the guide grooves 16.

Subsequently, as illustrated in FIG. 3, the second slide ring 36 is laid on the respective restricting blades 21 and the operation pins 23 of the respective restricting blades 21 are fitted to the fitting holes 37 of the second slide ring 36. Then, the retainer plate 41 with the reinforcement plate 42 laid thereto is laid on the second slide ring 36. At that time, the drive gear 53 of the drive unit M mounted on the retainer plate 41 is engaged with the driven teeth 35 of the drive ring 31.

Then, the base plate 11 and the retainer plate 41 are fixed with fixing screws. In this manner, the base plate 11, the first slide ring 15, the restricting blades 21, the second slide ring 36, the drive ring 31, the reinforcement plate 42, and the retainer plate 41 are integrated as being sequentially stacked upward.

[Blade Open-Close Operation]

Figure 9B:
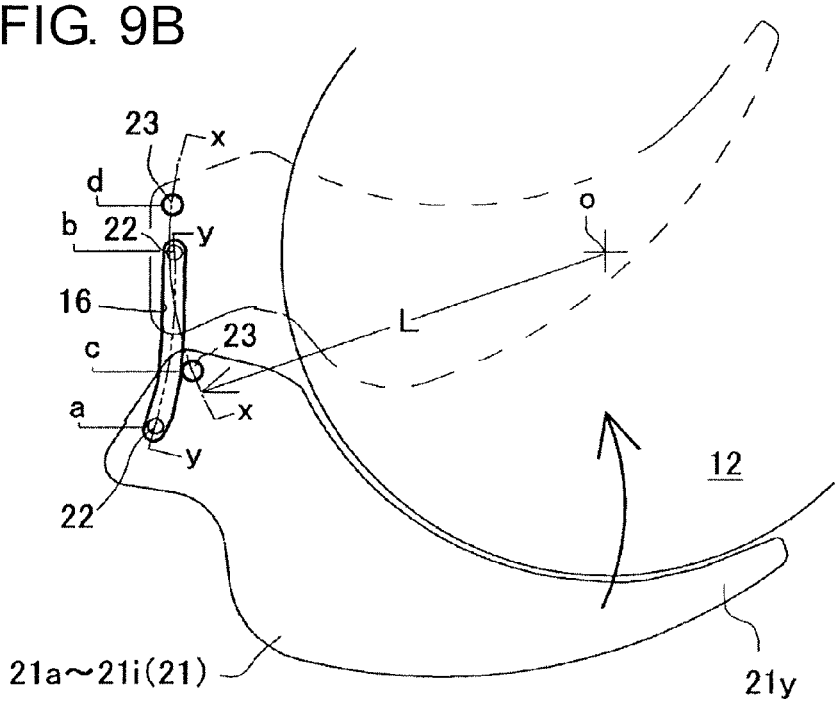

Next, open-close operation of the restricting blades 21 will be described with reference to FIGS. 9A and 9B. FIG. 9A illustrates a state that the plurality of restricting blades 21a to 21i are placed at the periphery of the optical path aperture 12. FIG. 9B illustrates a state of open-close operation of one of the plurality of restricting blades 21a to 21i. As illustrated in FIG. 9A, the plurality of restricting blades 21a to 21i are arranged in a scale-like manner at the periphery of the optical path aperture 12 at predetermined angle intervals around the optical axis (optical path center) O. In FIG. 9A, the nine restricting blades 21a to 21i are arranged at intervals of 40 degrees. The first protrusions (guide pins) 22 of the respective restricting blades 21a to 21i are fitted to the guide grooves 13 formed at the base plate 11. Along with the above, the second protrusions (operation pins) 23 of the respective restricting blades 21a to 21i are fitted to the fitting holes 33 of the drive ring 31.

Then, the drive ring 31 is rotated about the optical axis O in a predetermined angle range clockwise and counterclockwise by the abovementioned drive unit M. The blade open-close operation at that time will be described with reference to FIG. 9B. The operation pin 23 is rotationally moved clockwise from point c to point d on arc trajectory x-x at a radius L from the optical axis O owing to the rotation of the drive ring 31. Further, the guide pin 22 is moved from point a to point b on trajectory y-y along the guide groove 16.

Owing to the motion of the operation pin 23 and the guide pin 22, the restricting blade 21 performs close operation from an opened state (illustrated with a solid line in FIG. 9B) to a closed state (illustrated with a broken line in FIG. 9B). In the illustrated device, the optical path aperture 12 is set in a small aperture state with a small diameter when being in the closed state and is fully opened when being in the opened state. Accordingly, in accordance with current supplied to the drive unit M, the restricting blades 21 perform open-close operation at any aperture diameter in a range from the small-aperture state to the fully-opened state to adjust quantity of light passing through the optical path. That is, the light quantity adjusting device 100 adjusts light quantity by varying aperture diameter centered on the optical axis. In the light quantity adjusting device 100 described above, since the blade end faces 21u of the respective restricting blades 21 have no face parallel to the optical axis O, it is possible to prevent occurrence of flare, ghost, or the like at the blade end faces 21u.

[Optical Apparatus]

Figure 12:
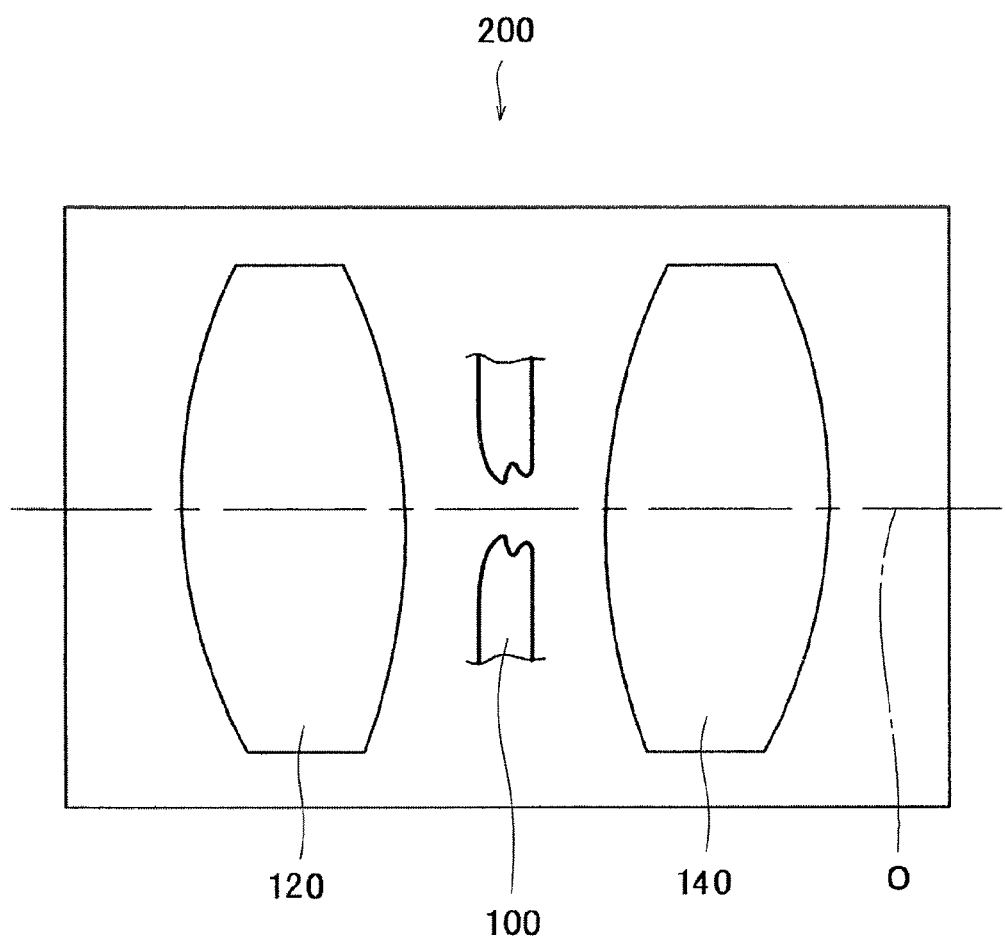
FIG. 12 is an explanatory view schematically illustrating a section of an optical apparatus which adopts the light quantity adjusting device of the embodiment.
Figure 13A:
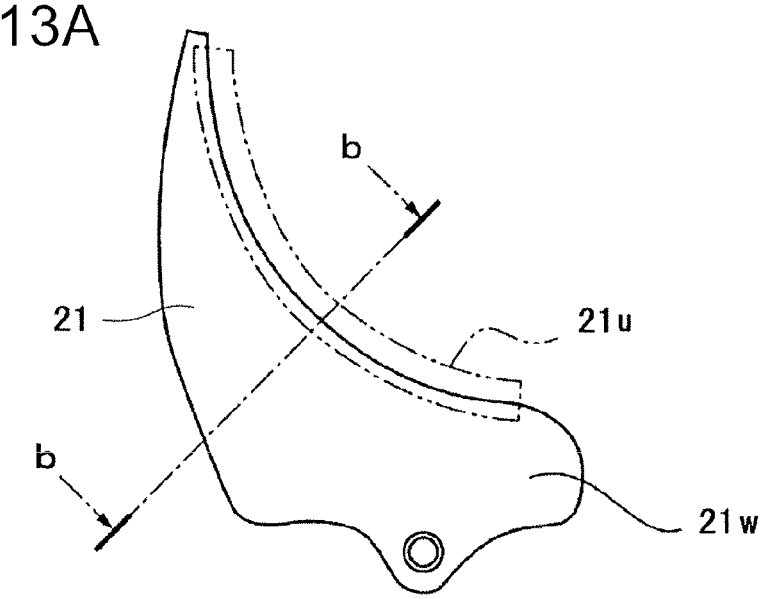
FIGS. 13A to 13C are explanatory views of the restricting blade, as FIG. 13A being a plane view illustrating a general structure of the restricting blade, FIG. 13B being a first explanatory view schematically illustrating a blade end face of a section at line b-b in FIG. 13A, and FIG. 13C being a second explanatory view schematically illustrating a blade end face of a section at line b-b.
Figure 13B:
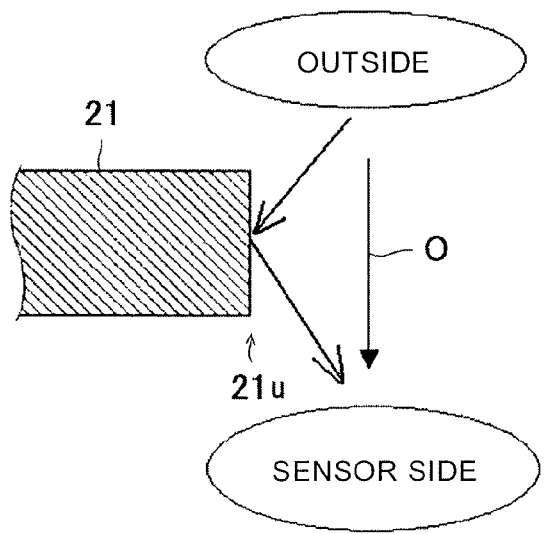
Figure 13C:
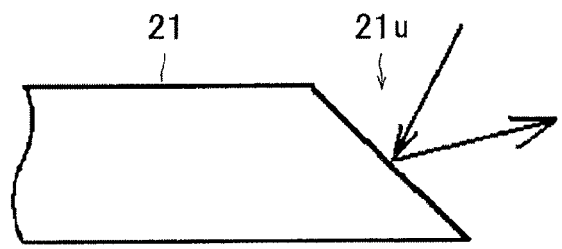

Next, an optical apparatus using the abovementioned light quantity adjusting device 100 will be described with an example of a telephoto lens. As illustrated in FIG. 12, an optical apparatus 200 includes a first optical system (lens unit) 120 and a second optical system (lens unit) 140 in a lens barrel. The light quantity adjusting device 100 is placed between the first and second optical systems 120, 140 as being centered on the optical axis O. Here, it is preferable that the restricting blades 21 of the light quantity adjusting device 100 are assembled so that the first slant portions 21p are placed to a side (lens unit 120 side) where external light enters. Further, at a photographing optical path, it is possible to form an object image with the second optical system 140 and to place imaging means at the image-forming face. The imaging means may adopt a solid-state imaging element such as a CCD, a sensitive film, or the like. The optical apparatus may be controlled by a CPU control circuit, an exposure control circuit, and a shutter drive circuit. Such an optical apparatus may include a main power switch and a shutter release switch. In addition, an auto-focus circuit and the like may be adopted for controlling a camera apparatus. However, since structures of the above are well-known, description thereof is skipped.

Since the optical apparatus 200 adopts the light quantity adjusting device 100 including the plurality of restricting blades 21 without having a face parallel to the optical axis O at the blade end faces 21u, occurrence of flare, ghost, or the like can be prevented. Here, not limited to a telephoto lens, a video camera, a still camera, and the like, the light quantity adjusting device 100 may be also applicable to an optical device such as a projecting apparatus like a projector or the like.

Figure 14:
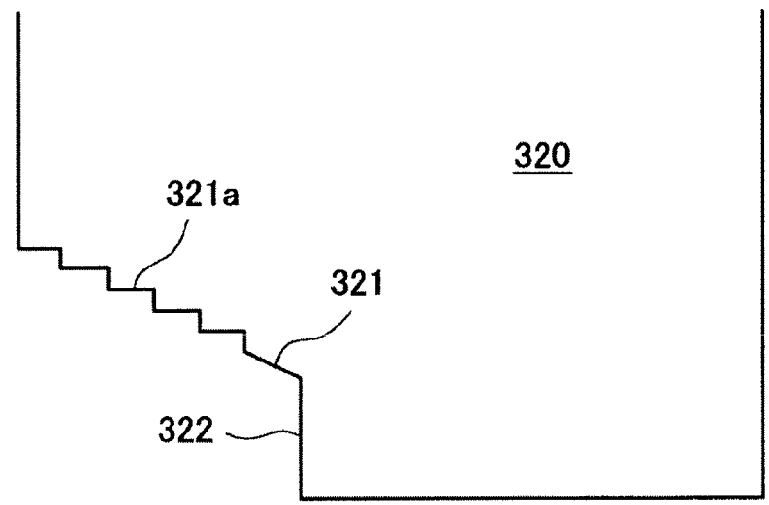
FIG. 14 is an explanatory view illustrating a modified example of a compressing punch of an end face forming apparatus illustrated in FIGS. 7A to 7C.
Figure 15:
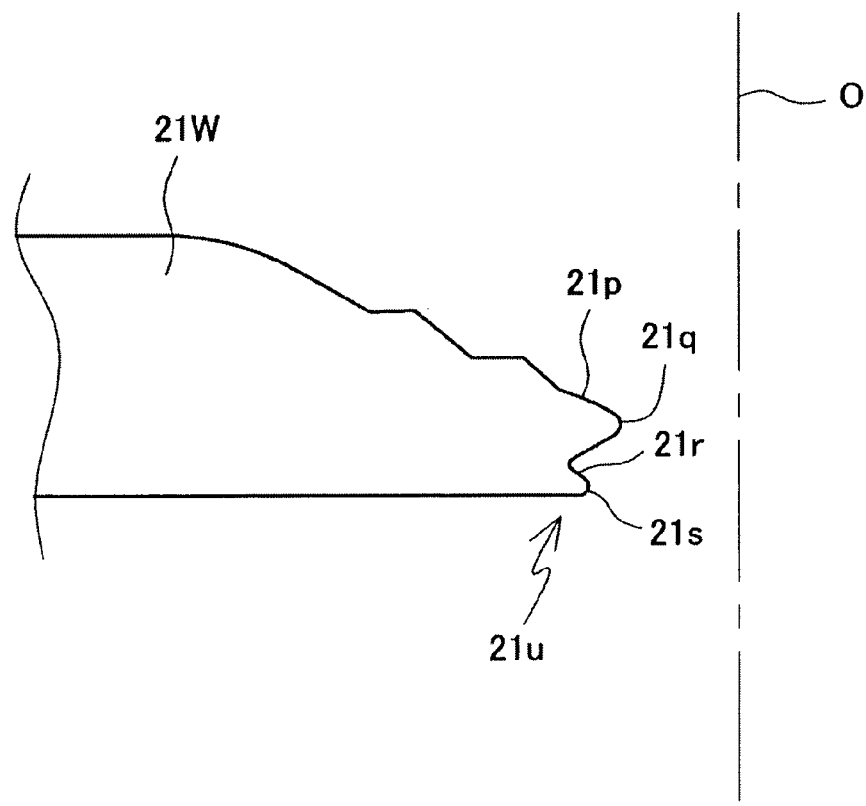
FIG. 15 is an explanatory view illustrating a shape of a blade end face processed using the compressing punch illustrated in FIG. 14.

In the description of the present embodiment, the compressing punch 320 has the slant face 321 which is linear as being slanted by a predetermined angle (δ°). However, as illustrated in FIG. 14, it is also possible to form the linear slant face 321 slanted by the predetermined angle (δ°) only at a portion which compresses the leading end D of the blade member B and to form a stepped face 321a at the rest thereof. FIG. 15 illustrates a shape of the blade end face 21u of the blade member B on which the compressing process is performed with the compressing punch 320 of this embodiment. Similarly to the blade end face 21u illustrated in FIG. 5B, the blade end face 21u illustrated in FIG. 15 includes the first slant portion 21p, the first leading end portion 21q, the second slant portion 21r, and the second leading end portion 21s, and then, the first leading end portion 21q is further protruded toward the optical axis O side than the second leading end portion 21s. Here, the first slant portion 21p is compressed stepwise by the stepped face 321a at the blade substrate 21w side, and then, is formed stepwise as returning after pressurization due to the material characteristics of the blade member B.

The present application claims a priority based on Japanese Patent Application No. 2012-095091 incorporated herein by reference in its entirety.

What is claimed is:

1. A restricting blade to be used for a light quantity adjusting device which adjusts light quantity by varying an aperture diameter centered on an optical axis, comprising:
   a blade substrate; and
   a blade end face which defines the aperture diameter as being an end face of the blade substrate,
   wherein the blade end face includes a first slant portion which is slanted against the optical axis, a first leading end portion which forms a leading end of the first slant portion, a second slant portion which is slanted in the approximately same direction as the first slant portion as being overlapped with the first slant portion along the optical axis, and a second leading end portion which forms a leading end of the second slant portion, and
   the first leading end portion is further protruded toward the optical axis than the second leading end portion.

2. A light quantity adjusting device which adjusts light quantity by varying an aperture diameter centered on an optical axis with movement of a plurality of restricting blades, each restricting blade comprising a blade substrate and a blade end face which defines the aperture diameter as being an end face of the blade substrate,
   wherein the blade end face includes a first slant portion which is slanted against the optical axis, a first leading end portion which forms a leading end of the first slant portion, a second slant portion which is slanted in the approximately same direction as the first slant portion as being overlapped with the first slant portion along the optical axis, and a second leading end portion which forms a leading end of the second slant portion, and
   the first leading end portion is further protruded toward the optical axis than the second leading end portion.

3. The light quantity adjusting device according to claim 2, wherein the first and second slant portions are slanted with curvature.

4. The light quantity adjusting device according to claim 2, wherein the restricting blade is made of resin having thickness of 80 micrometer or less.

5. The light quantity adjusting device according to claim 2, wherein the plurality of restricting blades are incorporated so that the first slant portions are faced to incoming light from the outside.

6. An optical apparatus comprising a photographing lens and the light quantity adjusting device according to claim 2.

* * * * *